United States Patent
Clementson et al.

[11] Patent Number: 6,000,665
[45] Date of Patent: Dec. 14, 1999

[54] SUPPORT DEVICE AND METHOD FOR USE WITH A MINIATURE ELECTRONIC DEVICE

[76] Inventors: David Clementson, 736 Forest Ave., Palo Alto, Calif. 94301; Steven R. Green, 10609 Londonshire La., Austin, Tex. 78739

[21] Appl. No.: 09/079,878

[22] Filed: May 15, 1998

[51] Int. Cl.$^6$ .................................................. B68G 5/00
[52] U.S. Cl. ..................... 248/118; 248/346.01; 248/918
[58] Field of Search ............................... 248/118, 118.1, 248/918, 346.01, 118.3, 118.5; 361/683

[56] References Cited

U.S. PATENT DOCUMENTS

| | | | |
|---|---|---|---|
| 4,482,064 | 11/1984 | Berke et al. | 248/118 X |
| 4,832,191 | 5/1989 | Gerver et al. | |
| 4,913,390 | 4/1990 | Berke | 248/118.3 X |
| 5,197,699 | 3/1993 | Smith et al. | 248/118 |
| 5,203,845 | 4/1993 | Moore | 248/118 |
| 5,305,980 | 4/1994 | Le Blanc | 248/309.1 |
| 5,340,067 | 8/1994 | Martin et al. | 248/118.5 |
| 5,358,203 | 10/1994 | Smith et al. | 248/118 |
| 5,451,020 | 9/1995 | Smith et al. | 248/118 |
| 5,470,036 | 11/1995 | Vu et al. | 248/118.5 |
| 5,490,647 | 2/1996 | Rice | 248/118.1 |
| 5,547,154 | 8/1996 | Kirchhoff et al. | 248/118.3 |
| 5,556,061 | 9/1996 | Dickie | 248/51 |
| 5,562,270 | 10/1996 | Montague | 248/118.1 |
| 5,570,268 | 10/1996 | Selker | 361/683 |
| 5,596,481 | 1/1997 | Liu et al. | 248/118.1 X |
| 5,628,483 | 5/1997 | Smith et al. | 248/118 |
| 5,678,800 | 10/1997 | Markussen | 248/346.1 |

OTHER PUBLICATIONS

Internet Web page of i2i UK Wrist Rest for Palm Pilot Image, Image obtained from Web Page of Innovations of Industry, URL=www.i2iuk.com [Home Page URL]; www.i2iuk.com/Images/WristRest.gif [Web Page showing Wrist Rest Picture as of Apr. 15, 1999].

*Primary Examiner*—Ramon O. Ramirez
*Attorney, Agent, or Firm*—Dergosits & Noah LLP

[57] ABSTRACT

A support device and method for use of a support device with a miniature electronic device are provided by the present invention. Use of the miniature electronic device is facilitated by the present invention's anchoring the miniature electronic device and ergonomically supporting the operator's hand such relative to the miniature electronic device. In the preferred embodiment of the invention, the support device includes a base member having a receiving member adapted to securably receive a miniature electronic device formed in an upper surface of the base member. The base member is preferably formed of an elastomeric material. The upper surface of the base member is dimensioned to support the hand of an operator of the miniature electronic device, such that the level of the operator's hand is substantially coplanar with the level of the top surface of the miniature electronic device. The receiving member can be positioned to accommodate right or left-handed operators. The receiving member can be formed either completely through the base member, as a depression that does not extend through the base member, and can be an insert member joined with the base member. The base member can be adapted for attachment to a fixed or to a mobile supporting surface.

26 Claims, 3 Drawing Sheets

SUPPORT DEVICE AND METHOD FOR USE WITH A MINIATURE ELECTRONIC DEVICE

FIELD OF THE INVENTION

The present invention relates to support devices for miniature electronic devices. Specifically, the present invention relates to a support device and a method for to ergonomically support an operator's hand during use of a miniature electronic device.

BACKGROUND OF THE INVENTION

In recent years, the miniaturization of electronic devices has made a plurality of small computing devices available. Advances in miniature packaging technology, pen-stroke recognition technology, and low-power electronics have enabled manufacturers to offer many new types of miniature computing devices, including hand-held computers, palmtop computers, and Personal Digital Assistants (PDA's).

Presently, miniature electronic devices such as hand-held computers are designed to be as small as possible. One detrimental effect of this design goal is that the ergonomics of the computers' use is compromised. In the case of hand-held, or palmtop computers, such devices' small size and weight can allow them to slip around when they are placed on smooth surfaces, such as desktops. This limits the operators' abilities to use such computers with one hand, since the use of the other hand is required to prevent the computer from slipping on the work surface.

A further ergonomic compromise caused by the miniaturization of hand-held computers relates to the miniaturization of their input devices. Tiny keyboards and small pen-stroke-recognition areas require the operators to position their fingers or styli very accurately relative to the bodies of such computers. This fine positioning is greatly facilitated if the operators' wrists or palms are allowed to rest on a surface whose position is fixed relative to the body of the computer. The small size of hand-held computers does not allow them to incorporate such a wrist or palm rest.

Another ergonomic compromise in the design of these hand-held computers relates to those types of computer which use pen-stroke, or handwriting recognition input devices. These "pen-based" computers are constrained by limitations in packaging technology to be of substantial thickness. When such pen-based computers are operated on a desktop or other flat support surface, the operator's writing hand must be placed in a position that accommodates the computer's thickness. This hand position is awkward, and causes more operator error and fatigue than would be the case if the operator were to write on a device with negligible thickness.

Heretofore, many devices have been used to help reduce the fatigue and increase the comfort of keyboard operators. For example, the device described in Kirchhoff et al., Wrist Rest Assembly, U.S. Pat. No. 5,641,369, is a wrist support for use along the front edges of a keyboard input device. Such wrist support devices are disadvantageous to operators of a hand-held computers because the supporting pads are not designed to fit the computer's case, and do not facilitate the positioning of the operators' hands optimally relative to said computers' bodies.

A device described in Lambden, Electrographic Apparatus and Hand Rest for use Therewith, U.S. Pat. No. 4,129,746 uses a hand supporting plate that is moveable relative to the body of the input device. This arrangement is unsuitable for application to portable computers because their small size requires that the operators' hands remain immobile relative to the computer, rather than moveable.

Sebastiani, Adjustable Stand for Electronic Calculators or the Like, U.S. Pat. No. 3,885,762 describes a folding calculator stand. This device does not provide support for the users' hands, and does not attempt to solve the problem of operator fatigue due to poor hand positioning.

A design for a personal digital assistant cradle device is shown Deluliis et al., Cradle for a Personal Digital Assistant, U.S. Pat. No. D373,121. However, this cradle does not have sufficient surface area to hold and support an operator's wrist during use of the personal digital assistant. As a result of this non-ergonomic design, an operator can suffer from wrist strain or fatigue after prolonged use of the personal digital assistant. Furthermore, this cradle design is dimensioned for a personal digital assistant only, and is not intended for use with other types of miniature electronic devices.

It is the object of this invention to provide a non-slip base for a miniature portable or hand-held computer that makes the computer easier to operate when it is used in conjunction with a desk or other support surface.

It is further the object of this invention to provide a hand rest for use with a miniature portable or hand-held computer that aids in anchoring the operator's hand relative to the case of the computer, thereby facilitating more accurate finger positioning relative to the computer's input device.

A further object of this invention is to provide a hand rest for use with miniature portable computers utilizing pen-stroke or handwriting recognition input devices that, when the computer is placed upon a desktop or other support surface, raises the operator's hand to a position above the support surface in such a way as to compensate for the thickness of the computer, thereby overcoming any discomfort associated with writing on a raised surface.

Still further objects and advantages will become apparent from a consideration of the ensuing description and accompanying drawings.

SUMMARY

The present invention is a support device and method for use with a miniature electronic device. The invention facilitates the use of such miniature electronic device by anchoring and ergonomically supporting the operator's hand relative to the miniature electronic device.

In the preferred embodiment of the invention, the support device includes a base member having a receiving member formed in an upper surface thereof. The receiving member is adapted to securably receive a miniature electronic device. The receiving member can be an aperture extending completely through the base member, a depression extending partially through the base member, or an insert member joined with the base member. The upper surface of the base member is dimensioned to support the hand of an operator of the miniature electronic device, such that the level of the operator's hand is substantially coplanar with the level of the top surface of the miniature electronic device.

In a first preferred embodiment of the invention, the receiving member is positioned to accommodate a right-handed operator. In a second, equally preferred embodiment, the receiving member is positioned to accommodate a left-handed operator. The receiving member can be formed completely through the base member, or can be formed as a depression that does not extend through the base member.

The base member is preferably formed of an elastomeric material. In a third embodiment of the invention, the base member is adapted to be attached to a supporting surface. This supporting surface can be a fixed surface, or a mobile surface.

DETAILED DESCRIPTION OF THE PREFERRED EMBODIMENT

The present invention is a support device and method for use with a miniature electronic device. The invention facilitates the use of such miniature electronic device by anchoring and ergonomically supporting the operator's hand relative to the miniature electronic device.

Figure 1:
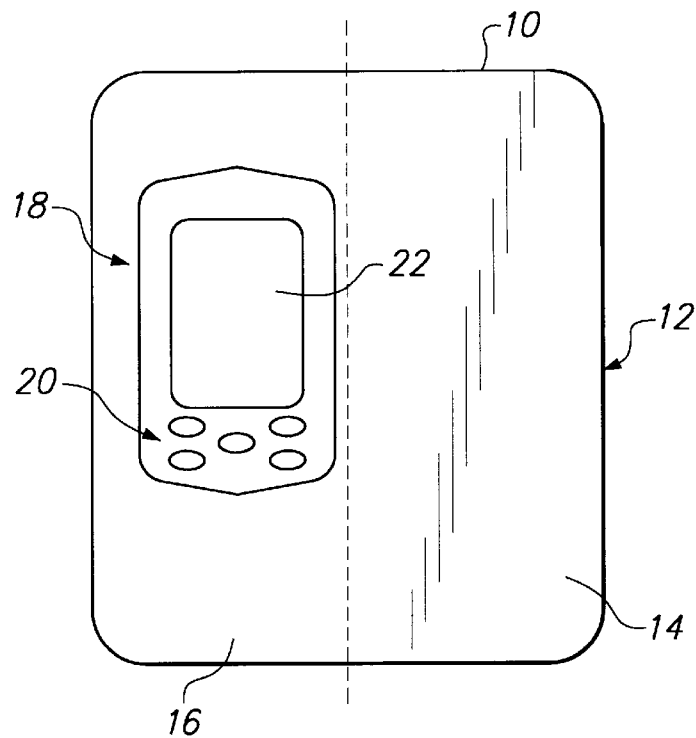
FIG. 1 is a top plan view of a first preferred embodiment of the support device according to the present invention.

FIG. 1 is a top plan view of a first preferred embodiment of the support device 10 according to the present invention. The invention comprises a base member 12 having a planar upper surface 14. The base member is preferably formed of an elastomeric material, such as a flat sheet of open-celled sponge rubber.

A receiving member 18 is formed in the upper surface of the base member. The receiving member is adapted to securely receive and retain a miniature electronic device 20. Examples of such miniature electronic devices include, but are not limited to a personal digital assistant, portable computer game player, calculator, graphic art tablet, and an electronic address book.

The upper surface of the base member is dimensioned to support the hand of an operator of the miniature electronic device, such that the level of the operator's hand is substantially coplanar with the level of the top surface 22 of the miniature electronic device. The receiving member can be positioned to comfortably accommodate a right-handed or a left-handed operator. For example, in the embodiment shown in FIG. 1, the receiving member is positioned in the left side 16 of the upper surface of the base member. The hand of a right-handed operator can therefore be comfortably supported on the base member upper surface during use of the miniature electronic device.

Figure 2:
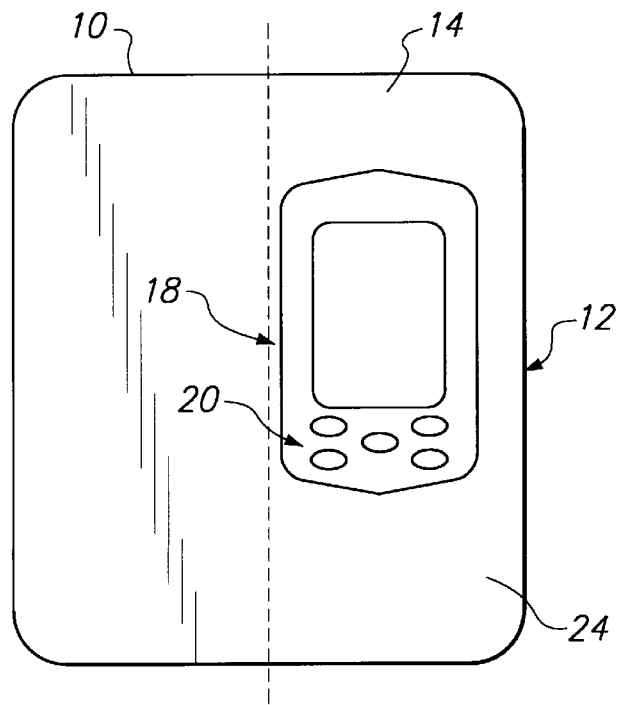
FIG. 2 is a top plan view of a second, equally preferred embodiment of the support device according to the present invention.

FIG. 2 is a top plan view of a second, equally preferred embodiment of the hand held support according to the present invention. In the embodiment shown in FIG. 2, the receiving member 18 is positioned in the right side 24 of the upper surface 14 of the base member 12. The hand of a left-handed operator can therefore be comfortably supported on the base member upper surface during use of the miniature electronic device.

Operation and use of the present invention is simple and straightforward. The base member is placed on a supporting surface in either the left-handed or right-handed orientation, according to the operator's preference. Next, the miniature electronic device is inserted into the receiving member. The operator can now use the miniature electronic device more easily because the miniature electronic device is held firmly in place on the supporting surface by virtue of the traction provided by the base member.

In one embodiment of the present invention, the receiving member is formed completely through the base member. In this embodiment, the base member has a width that is substantially equal to the width of the miniature electronic device. This embodiment of the present invention can also be adapted for use with either a right-handed or a left-handed operator. When the base member is turned over, a receiving member that is positioned on, for example, the left side of the upper surface of the base member will now be positioned on the left side of the exposed lower surface (not shown). This reversible embodiment of the present invention is used to advantage with miniature electronic devices which have left/right symmetry.

In an alternative embodiment, the receiving member is formed as a depression that does not extend completely through the base member. In this embodiment, the depression is of sufficient depth to cause the upper surface of the base member to be coplanar with the top surface of the miniature electronic device.

The receiving member can alternately be an insert member (not shown) joined with the base member. For example, an insert formed of a material such as plastic can be dimensioned to receive a particular type or shape of miniature electronic device. This insert member can then be, for example, disposed within an aperture, or otherwise joined to the base member for receiving the miniature electronic device therein.

Either or both of the upper and or lower surfaces of the base member can be textured in such a way as to provide traction against desktops or other support surfaces, thereby providing extra stability for the miniature electronic device. In the reversible embodiment, both upper and lower surfaces of the base member can be constructed with finished surfaces. A surface can be finished by such means as smoothing, coating the surface with paint or enamel, applying appliques or decals to the surface, or patterning the surface with text or graphical designs.

Figure 3:
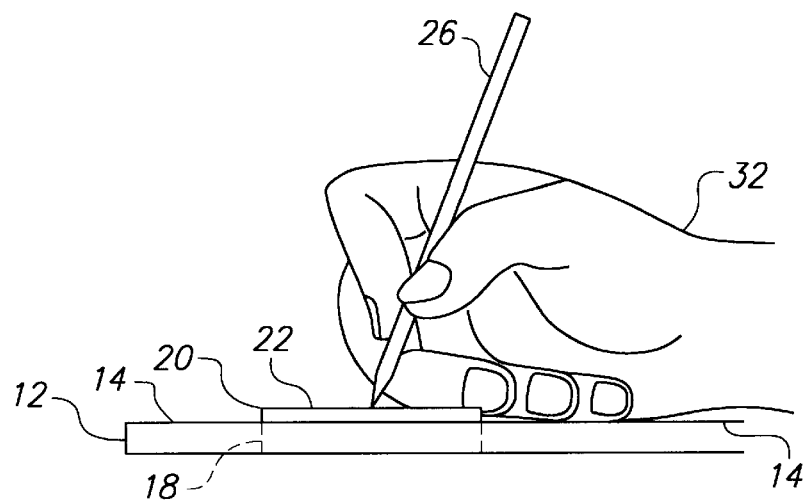
FIG. 3 is a side sectional view of the support device according to the present invention.

FIG. 3 is a side sectional view of the hand held support according to the present invention. In the Figure, the miniature electronic device 20 has been inserted into the receiving member 18 such that the top surface 22 of the miniature electronic device protrudes slightly above the upper surface of the base member. The top surface of the miniature electronic device can be either coplanar with, or alternatively slightly raised above, the upper surface 14 of the base member 12, as long as the operator's hand is substantially level with the top surface of the miniature electronic device. In the embodiment illustrated in FIG. 3, the operator's wrist 32 can be comfortably supported on the upper surface of the base member, while the operator's hand is at the approximate level of the top surface of the miniature electronic device, for example, when using a pen or stylus 26.

As can best be seen in FIG. 3, extra ease of use is achieved for operators of miniature electronic devices such as penstroke or handwriting recognition computers as a result of the positioning of the operator's wrist when supported by the base member. The added thickness of the base moves the heel of operator's hand upward off of the tabletop to a level that is coplanar with the computer's writing surface. Instead of having to accommodate the total thickness of the computer by tensioning the hand and finger muscles, the operator is able to use a more relaxed, natural writing position, and consequently benefits from reduced hand fatigue.

Figure 4:
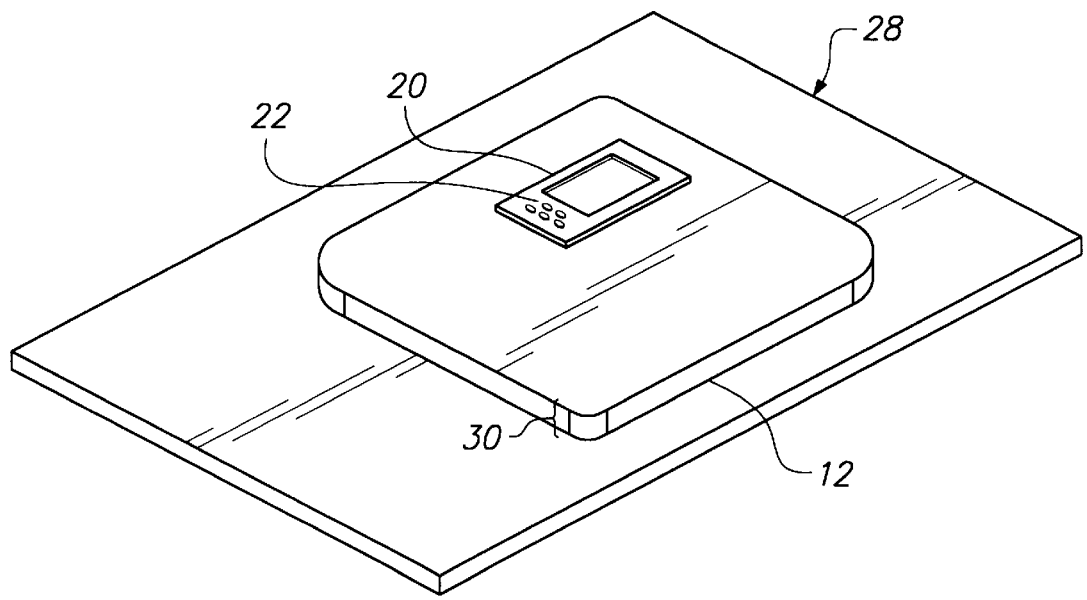
FIG. 4 is an isometric view of a support device attached to a supporting surface according to a third embodiment of the present invention.

In a third embodiment of the invention, the base member is adapted to be attached to a supporting surface. FIG. 4 is an isometric view of a support device attached to a supporting surface 28 according to a third embodiment of the present invention. This supporting surface can be a fixed surface, such as a table or desk, or a mobile surface, such as a clipboard, folio, binder, cradle, or similar object.

In the embodiment of the present invention illustrated in FIG. 4, the stabilizing base member 12 is attached to a clipboard, binder, or folio. Stabilizing action takes place between the of operator's hand and the body of the miniature electronic device 20, even though the stabilizing base member is not referenced to a fixed supporting surface. The operator accrues benefit due to the favorable hand positioning afforded by the thickness 30 of the stabilizing base member compensating for the thickness of the miniature electronic device to raise the operator's hand to a substantially even level with the top surface 22 of the miniature electronic device.

Accordingly, it can be seen that according to the invention, a stabilizing cushioned base member can be provided with a receiving member that is form-fitting to miniature electronic devices such as hand-held computers, personal digital assistants, or palmtop computers. When the miniature electronic device placed in the receiving member, and the operator's hand is allowed to rest on the upper surface of the base member, the miniature electronic device is rendered relatively immobile relative to the heel of the operator's hand because of the traction provided by the base member's cushioned, elastomeric lower surface. When the base is placed on a fixed supporting surface such as a desk, further stability results from the traction the base member provides against, for example, the desktop. For miniature electronic devices such as pen-type computers, the depth of the receiving member or depression in the base member is sized according to the thickness of the miniature electronic device so that the base member elevates the operator's hand to the level of the miniature electronic device's writing surface, and thereby compensates for the miniature electronic device's thickness.

Although the description above contains many examples, these should not be construed as limiting the scope of the present invention but as merely providing illustrations of some of the presently preferred embodiments of this invention. Various other embodiments and ramifications are possible within its scope. For example, the cushioned base member can be built into a mobile supporting surface adapted for hand-held, automotive, or other mobile usage.

Figure 5:
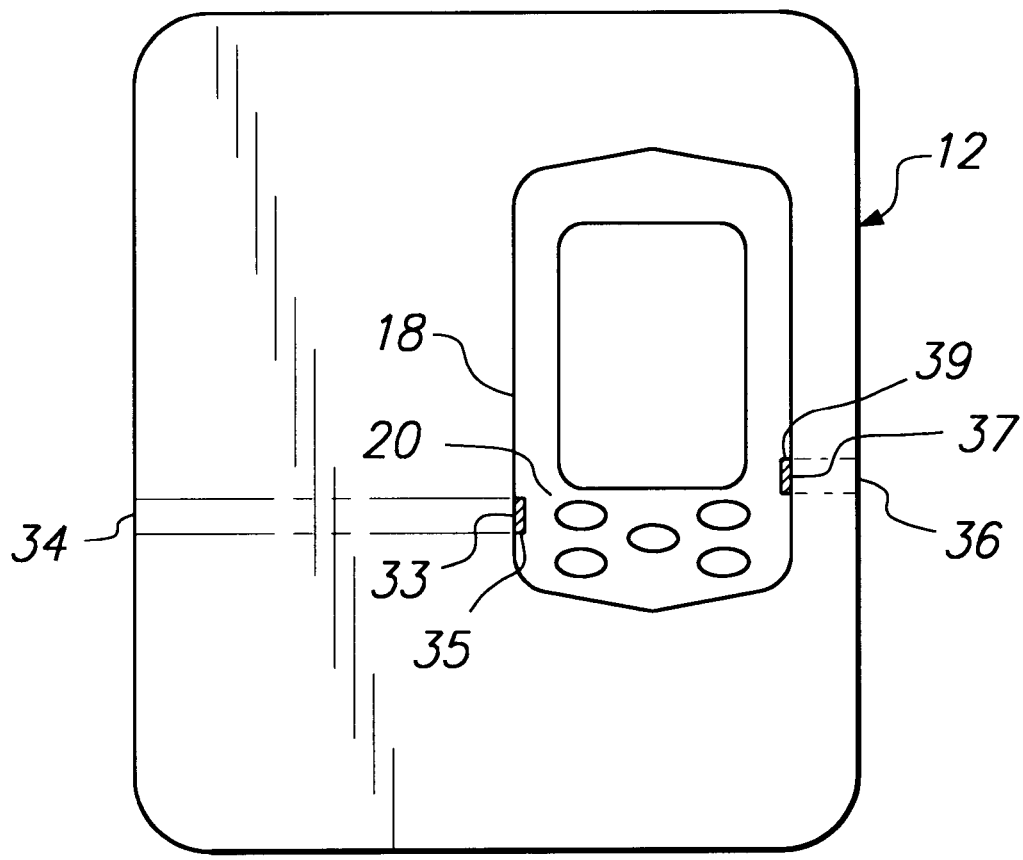
FIG. 5 is a top plan view of a fourth embodiment according to the present invention.

FIG. 5 is a top plan view of a fourth embodiment according to the present invention. In this embodiment, the base member includes one or more conduits 34, 36 formed therein for receiving cables or other connecting devices. Such conduits can be formed as channels cut or molded as a part of the base member. Alternatively, the conduits can be members inserted within the base member. Such inserted members can be formed of materials including plastics or metals, and can be, for example, electrically, thermally, optically, and/or mechanically insulative or conductive.

Connecting devices that can be inserted into a conduit can include active circuit boards, connectors, wires, lightpipes, and batteries. Furthermore, an electronic device such as a modem, removable media drive, CDROM drive, or digital video disk can be inserted into a conduit, or constructed as an integral part of the base member.

For example, a conduit can be adapted to accommodate a printer cable connection between the miniature electronic device and a printer. In such case, the conduit is positioned with its interior aperture 33, 37 in registration with corresponding port 35 or socket 39 of the miniature electronic device, and the conduit is dimensioned to receive the appropriate cable or connection means for attachment to the port or socket.

Similarly, a conduit can be adapted to receive cables for interconnecting the miniature electronic device with other external devices, such as modems, external hard drives, telephone sockets, external monitors, or with power supplies, such as electrical sockets, batteries, or battery chargers. One skilled in the art will readily recognize that such conduits can be configured to accommodate other connectors such as terminators, or to permit direct connection between the miniature electronic device and an external device.

While the present invention has been described in terms of a preferred embodiment above, those skilled in the art will readily appreciate that numerous modifications, substitutions and additions may be made to the disclosed embodiment without departing from the spirit and scope of the present invention. For example, in the preferred embodiment of the invention, the base member is formed of an elastomeric material, such as a flat sheet of open-celled sponge rubber. Sponge rubber material provides three features that are used to advantage in the present invention. First, sponge rubber is rigid enough to support the hand. Second, sponge rubber provides sufficient friction against a supporting surface to prevent the base member from sliding. Additionally, sponge rubber provides cushioning to reduce the surface pressure on the heel of the hand. It is relatively simple to fabricate the present invention from sponge rubber, because the invention can be produced as a cutout from a flat slab of standard sponge rubber material.

However, alternative embodiments of the present invention can be formed of any other suitable material or combination of materials, and more particularly a material (or materials) that provides the same three features described above with respect to sponge rubber. For example, the base member can be formed of materials such as plastic, rubber, and natural fibers.

In addition, one skilled in the art will readily appreciate that the present invention can be implemented using a base member that has an upper surface that is not parallel with the base member lower surface, or any supporting surface thereof. Thus, the upper surface can be convexly or concavely curved, tilted, or angled. Thus, for example, the base member can have an increased width on the left side, to more comfortably angle the hand of a right-handed operator. Similarly, the base member can have an increased width on the right side, to more comfortably angle the hand of a left-handed operator. In addition, the base member can be inclined from either the top or bottom, as an example, for more convenient use when attached to a fixed or mobile supporting surface.

In the preferred embodiment of the present invention, the upper surface of the base member is dimensioned to provide sufficient surface area to support the hand and wrist of the operator such that the operator's hand is substantially coplanar with the top surface of the miniature electronic device. For example, in one embodiment, the base member can have a length that extends to but not beyond, the operator's wrist, while in an alternative embodiment, the length of the base member can extend beyond the operator's wrist. Similarly, the base member can have any suitable width that is sufficient to adequately support the operator's hand to the requisite level.

The skilled artisan will readily appreciate that the present invention is in no way limited to use with a particular type of miniature electronic device. It is intended that all such modifications, substitutions and additions fall within the scope of the present invention, which is best, defined by the claims below.

We claim:

1. A support device adapted to use with a miniature electronic device, comprising:
   a base member having an upper and a lower surface, and with a thickness, the upper surface surrounded by at least one edge; and
   a miniature electronic device receiving member disposed in the base member adapted to receive the miniature electronic device, such that a top surface of the miniature electronic device is substantially coplanar with the upper surface, and such that the receiving member is completely sounded by the edge surrounding the upper surface, wherein the upper surface is adapted to be dimensioned to support an operator's hand at a level substantially even with the miniature electronic device's top surface, wherein a stable support is provided for the miniature electronic device.

2. The support device of claim 1, wherein the receiving member is formed completely through the base member.

3. The support device of claim 2, wherein the base member is dimensioned such that the height of the base member is adapted to be substantially equal to the height of the miniature electronic device.

4. The support device of claim 1, wherein the receiving member is formed to a depth sufficient to securely support the miniature electronic device such that the top surface of the electronic device is substantially coplanar with the upper surface.

5. The support device of claim 1, wherein the receiving member is positioned to accommodate a right-handed operator.

6. The support device of claim 1, wherein the receiving member is positioned to accommodate a left-handed operator.

7. The support device of claim 1, wherein the base member is formed of an elastomeric material.

8. The support device of claim 1, wherein the base member is adapted for attachment to a supporting surface.

9. The support device of claim 1, further comprising at least one conduit formed in the base member for receiving a cable or other connecting device.

10. A support device adapted to use with a miniature electronic device, comprising:
    a base member formed of an elastomeric material, the base member being adapted for attachment to a supporting surface, the base member further having an upper surface surrounded by at least one edge and a lower surface; and
    a miniature electronic device receiving member disposed in the base member adapted to securably receive the miniature electronic device, such that a top surface of the miniature electronic device is substantially coplanar with the upper surface, such that the receiving member is completely surrounded by the edge surrounding the upper surface, wherein the upper surface is adapted to be dimensioned to support an operator's hand at a level substantially even with the miniature electronic device's top surface, wherein a stable support is provided for the miniature electronic device.

11. The support device of claim 10, wherein the receiving member is formed completely through the base member.

12. The support device of claim 11, wherein the base member is dimensioned such that the height of the base member is adapted to be substantially equal to the height of the electronic device.

13. The support device of claim 10, wherein the receiving member is formed to a depth sufficient to securely support the miniature electronic device such that the top surface of the electronic device is substantially coplanar with the upper surface.

14. The support device of claim 10, wherein the receiving member is positioned to accommodate a right-handed operator.

15. The support device of claim 10, wherein the receiving member is positioned to accommodate a left-handed operator.

16. The support device of claim 10, further comprising at least one conduit formed in the base member for receiving a cable or other connecting device.

17. A method for supporting a miniature electronic device, comprising the step of forming a receiving member in an upper surface of a base member the upper surface surrounded by at least one edge, the receiving member dimensioned for securably receiving the miniature electronic device, such that a top surface of the miniature electronic device is substantially coplanar with the upper surface, and such that the receiving member is completely surrounded by the edge surrounding the upper surface, wherein the upper surface is adapted to be dimensioned to support an operator's hand at a level substantially even with the miniature electronic device's top surface wherein a stable support is provided for the miniature electronic device.

18. The method of claim 17, further comprising the step of forming the receiving member completely through the base member, wherein the base member is dimensioned such that the height of the base member is adapted to be substantially equal to the height of the miniature electronic device.

19. The method of claim 17, wherein the receiving member is formed to a depth sufficient to securely support the miniature electronic device such that the top surface of the electronic device is substantially coplanar with the upper surface.

20. The method of claim 17, further comprising the step of positioning the receiving member to accommodate any of a right-handed operator and a left-handed operator.

21. The method of claim 17, wherein the base member is formed of an elastomeric material.

22. The method of claim 17, further comprising the step of adapting the base for attachment to a supporting surface.

23. The method of claim 17, further comprising the step of forming within the base member at least one conduit for receiving a cable or other connecting device.

24. A support device adapted to use with a miniature electronic device, comprising:
    a base member having an upper and a lower surface and with a thickness, the upper surface surrounded by a plurality of edges;
    at least one conduit formed in the base member for receiving a cable or other connecting device; and
    a miniature electronic device receiving member disposed in the base member for receiving the miniature electronic device, such that a top surface of the miniature electronic device is substantially coplanar with the upper surface, and such that the receiving member is completely surrounded by the edges surrounding the upper surface, wherein the upper surface is adapted to be dimensioned to support an operator's hand at a level substantially even with the miniature electronic device's top surface.

25. A support device adapted to use with a miniature electronic device, comprising:
- a base member formed of an elastomeric material, the base member being adapted for attachment to a supporting surface, the base member further having an upper surface and a lower surface, the upper surface surrounded by a plurality of edges;
- at least one conduit formed in the base member for receiving a cable or other connecting device; and
- a miniature electronic device receiving member disposed in the base member for securably receiving the miniature electronic device, such that a top surface of the miniature electronic device is substantially coplanar with the upper surface, and such that the receiving member is completely surrounded by the edges surrounding the upper surface, wherein the upper surface is adapted to be dimensioned to support an operator's hand at a level substantially even with the miniature electronic device's top surface.

26. A method for supporting a miniature electronic device, comprising the steps of:
- forming a receiving member in an upper surface of a base member, the upper surface being surrounded by a plurality of edges, the receiving member dimensioned for securably receiving the miniature electronic device, such that a top surface of the miniature electronic device is substantially coplanar with the upper surface, and such that the receiving member is completely surrounded by the edges surrounding the upper surface, wherein the upper surface is adapted to be dimensioned to support an operator's hand at a level substantially even with the miniature electronic device's top surface; and
- forming within the base member at least one conduit for receiving a cable or other connecting device.

* * * * *